(12) United States Patent
Hajjar et al.

(10) Patent No.: US 9,052,521 B2
(45) Date of Patent: Jun. 9, 2015

(54) OPTICAL COMPONENT CALIBRATION SYSTEM FOR LASER-BASED DISPLAY DEVICE

(75) Inventors: Roger Hajjar, San Jose, CA (US); Chris Butler, Acton, MA (US); Brian Tremaine, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 1279 days.

(21) Appl. No.: 12/795,490

(22) Filed: Jun. 7, 2010

(65) Prior Publication Data

US 2011/0298695 A1 Dec. 8, 2011

(51) Int. Cl.
| | |
|---|---|
| G09G 3/00 | (2006.01) |
| G09G 3/34 | (2006.01) |
| G02B 27/32 | (2006.01) |
| G02B 26/10 | (2006.01) |
| H04N 5/00 | (2011.01) |
| H04N 9/31 | (2006.01) |

(52) U.S. Cl.
CPC .............. *G02B 27/32* (2013.01); *G02B 26/101* (2013.01); *H04N 5/00* (2013.01); *H04N 9/3135* (2013.01); *H04N 9/3194* (2013.01)

(58) Field of Classification Search
CPC ............ H04N 1/00129; H04N 9/3161; H04N 9/3164; H04N 9/3194
USPC .......................................................... 345/84
See application file for complete search history.

(56) References Cited

U.S. PATENT DOCUMENTS

| | | | | |
|---|---|---|---|---|
| 4,999,703 | A * | 3/1991 | Henderson | 348/747 |
| 5,138,441 | A | 8/1992 | Tanaka | |
| 7,133,022 | B2 * | 11/2006 | Grabert | 345/156 |
| 2003/0206248 | A1 * | 11/2003 | Childers | 348/745 |
| 2005/0104965 | A1 * | 5/2005 | Anderson | 348/190 |
| 2007/0187616 | A1 * | 8/2007 | Burroughs et al. | 250/458.1 |
| 2007/0188417 | A1 | 8/2007 | Hajjar et al. | |
| 2009/0001272 | A1 * | 1/2009 | Hajjar | 250/354.1 |
| 2010/0097678 | A1 * | 4/2010 | Hajjar et al. | 359/198.1 |

FOREIGN PATENT DOCUMENTS

| | | |
|---|---|---|
| CN | 101689341 A | 3/2010 |
| DE | 19912389 | 10/2000 |
| EP | 2 144 447 | 1/2010 |

OTHER PUBLICATIONS

GB Search Report for Application No. GB1109490.1 dated Sep. 15, 2011.
Office action dated Nov. 29, 2013 for Chinese Patent Application No. 201110218561.5.
Office Action dated May 23, 2014 for Chinese Patent Application No. 201110218561.5.

* cited by examiner

*Primary Examiner* — Alexander S Beck
*Assistant Examiner* — Mihir Rayan
(74) *Attorney, Agent, or Firm* — Patterson & Sheridan, LLP

(57) ABSTRACT

A laser-based display device includes a plurality of ultraviolet lasers configured to excite a phosphor-containing display screen in order to produce visible light. The laser-based display device also includes a reference laser used for calibration operations. A control system within the laser-based display device causes the reference laser beam to scan across one or more calibration features, and adjusts optical components of the laser-based display device, including activation timing of the ultraviolet lasers, based on feedback patterns generated by the calibration features, to compensate for drift effects. The calibration features may be disposed off-screen or on-screen.

28 Claims, 13 Drawing Sheets

OPTICAL COMPONENT CALIBRATION SYSTEM FOR LASER-BASED DISPLAY DEVICE

BACKGROUND OF THE INVENTION

1. Field of the Invention

Embodiments of the present invention relate generally to a display device and, more specifically, to an optical component calibration system for a laser-based display device.

2. Description of the Related Art

Electronic display systems are commonly used to display information from computers and other sources. One well-known type of display device is a cathode-ray tube (CRT) display. A CRT display includes one or more electron guns that accelerate electrons towards an inner surface of a display screen. A layer of phosphors disposed on the screen phosphoresces when impacted by the electrons, causing visible light to emanate from an outer surface of the screen. The CRT display also includes a set of magnetic coils that deflect the trajectory of the electrons emitted by, the electron gun in order to cause the electrons to impact specific positions on the inner surface of the display screen. The resulting visible light forms an image on the outer surface of the display screen. CRT displays usually require calibration in order to function properly. For example, the magnetic coils must be configured to deflect the electrons onto specific positions on the inner surface of the screen and not onto any other region within the CRT display.

In some modern devices, a laser beam or multiple laser beams are used to excite phosphor material-containing regions (pixels) of a display screen instead of an electron gun. In such devices, a laser module transmits a laser beam towards a spinning polygon having a plurality of mirrored facets. As the polygon rotates, the different facets reflect the laser beam towards the display screen. The laser module transmits the laser beam towards the polygon during particular time intervals so that the laser beam is reflected only towards the display screen, and not reflected towards any off-screen regions. Since the polygon rotates at several thousands of revolutions per minute and since the phosphor pixels are small, the laser module must pulse the laser beam with precise timing with a very small margin for error. Due to the small margin for error, calibrating the activation timing of the laser module can be difficult and unreliable.

A system for calibrating the activation timing of excitation laser beams in a laser module is disclosed in U.S. Patent Application Pub. No. 2010/0097678, entitled "Servo Feedback Control Based on Designated Scanning Servo Beam in Scanning Beam Display Systems with Light-Emitting Screens." In this system, a non-imaging servo beam is directed at calibration features disposed on a display screen and reflected towards an optical sensor. The optical sensor produces feedback signals indicative of positioning of the non-imaging servo beam in relation to the display screen. The activation timings of the excitation beams are then adjusted relative to the activation timing of the non-imaging servo beam to control the alignment of the excitation beams relative to the display screen.

Even after the display device is calibrated in the above manner, the optical components of the display device may go out of calibration during use as a result of drift, e.g., due to changes in temperature. To correct for this drift, the user could wait until the laser-based display device is not being used and perform the calibration described above at that time. However, this may not be practical because some display devices are used continuously over many hours. Also, the onset of some drift effects may occur quite rapidly and before a user has an opportunity to recalibrate the display device in the above manner. Therefore, what is needed in the art is a calibration technique for a laser-based display device that compensates for drift during user operation of the display device while maintaining the quality of the displayed image.

SUMMARY OF THE INVENTION

One or more embodiments of the invention provide a method and a system for adjusting optical components of a laser-based display device to compensate for drift effects such as imprecise timing of the activation of the lasers, either individually or as a group, and spatial misalignment of the vertical scan positions of the lasers, either individually or as a group.

According to the embodiments of the invention, adjustments for drift compensation are carried out based on optical feedback signals that are generated from laser beams scanned across calibration features that are disposed off-screen or on-screen. In the off-screen embodiment, the calibration features are disposed in an off-screen calibration module that is physically separate from the display screen. An advantage of this embodiment is that optical feedback signals that are generated for drift compensation can be completely contained within this off-screen calibration module, and thereby significantly reduce the risk of light bleed into the display region. In the on-screen embodiment, the calibration features are disposed on the display screen. An advantage of this embodiment is that it is simpler and more cost efficient because the same components that are used for factory calibration may be used for drift compensation.

A method according to an embodiment of the invention is carried out while an image is being generated on a display surface and includes the steps of scanning a reference laser beam across a calibration feature disposed in an off-screen calibration module that is physically separate from the display surface or an on-screen calibration feature, scanning imaging laser beams across the calibration feature, and adjusting an activation timing of the imaging laser beams based on relative timings of when the reference laser beam and the imaging laser beams are scanned across the calibration feature.

A method according to another embodiment of the invention includes the steps of scanning a laser beam across first and second parts of a calibration feature disposed in an off-screen calibration module that is physically separate from the display surface or first and second parts of an on-screen calibration feature, and calibrating one of the optical components based on relative amounts of light detected when the laser beam is scanned across the first and second parts of the calibration feature.

A method according to still another embodiment of the invention includes the steps of scanning a laser beam across a calibration feature disposed in an off-screen calibration module that is physically separate from the display surface or an on-screen calibration feature, determining a vertical position of a displayed image based on a feedback pattern detected when the laser beam is scanned across the calibration feature, and adjusting the vertical position of the displayed image.

A laser-based display device that is configured to perform off-screen drift compensation includes a display screen and a component housing including therein laser beam sources for producing laser beams including at least one calibration laser beam, a rotating polygon having a plurality of mirrored facets, each mirrored facet causing the laser beams to be scanned as the rotating polygon rotates, and an off-screen calibration module having passive calibration features that are positioned in optical paths of the laser beams reflected by the mirrored facets.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the present invention generally provide a method and apparatus for adjusting optical components of a laser-based display device. The adjustments according to embodiments of the invention are carried out with an off-screen calibration module that contains the laser beams used during calibration so that the risk of light bleed into the display region during calibration is significantly reduced and the quality of the image being displayed can be maintained, or with on-screen calibration features so that the same components that are used for factory calibration may be used to perform the adjustments.

Figure 1:
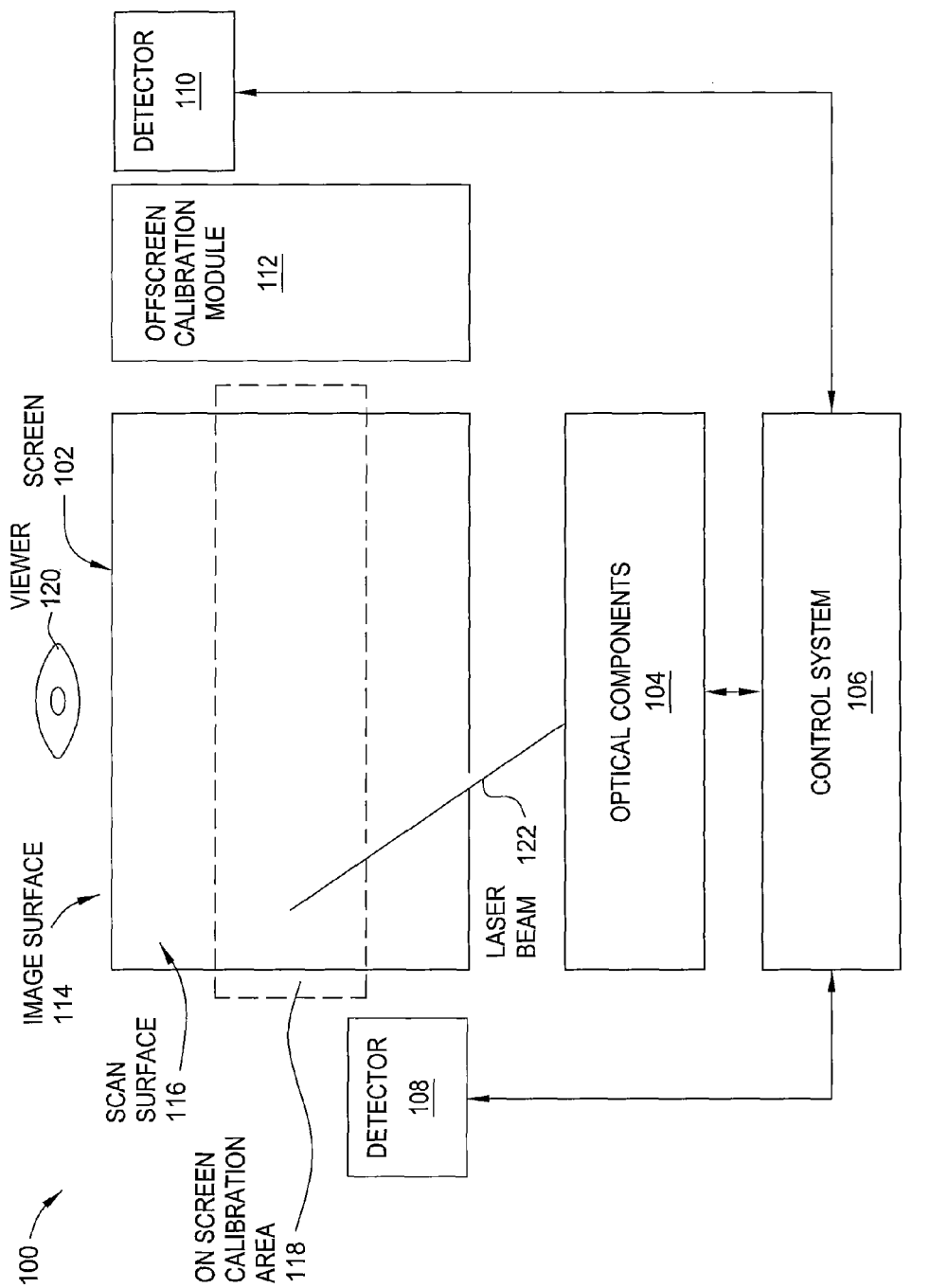
FIG. 1 illustrates a schematic of a laser-based display device according to an embodiment of the invention.

FIG. 1 illustrates a laser-based display device 100 according to an embodiment of the invention. As shown, the laser-based display device 100 includes a display screen 102, optical components 104, a control system 106, detector 108 and 110, and an off-screen calibration module 112. The display screen 102 includes on opposite sides thereof an image surface 114 and a scan surface 116. The image surface 114 is on an external side of a housing (not shown) that encloses the components of the laser-based display device 100. The image surface 114 is configured to display digital images that are visible to a viewer 120. The scan surface 116 is on an internal side of the housing that encloses the components of the laser-based display device 100.

The optical components 104 are configured to emit one or more laser beams 122 onto the scan surface 116 of the display screen 102. The display screen 102 includes a phosphor layer that emits visible light when excited by the optical energy conducted by the laser beam 122. The optical components 104 are configured to emit one or more laser beams 122 that sweep across the phosphor layer of the display screen 102 in order to create visible light that represents an image. The visible light associated with the image emanates through the image surface 114 of the display screen 102 to the viewer 120. The viewer 120 may then view the image. In this fashion, the laser-based display device 100 is configured to cause one or more images to appear on the image surface 114.

The control system 106 is configured to transmit command data to the optical components 104 in order to cause the optical components 104 to emit the laser beams 122 onto the scan surface 116. The control system 106 is also configured to calibrate the optical components 104. In doing so, the control system 106 may perform calibration operations involving an on-screen calibration area 118 and the detectors 108, as described in greater detail below in conjunction with FIG. 3, as well as involving the off-screen calibration module 112 and the detector 110, as described in greater detail below in conjunction with FIGS. 4-8. The control system 106 is described in greater detail below in conjunction with FIG. 2.

Figure 2:
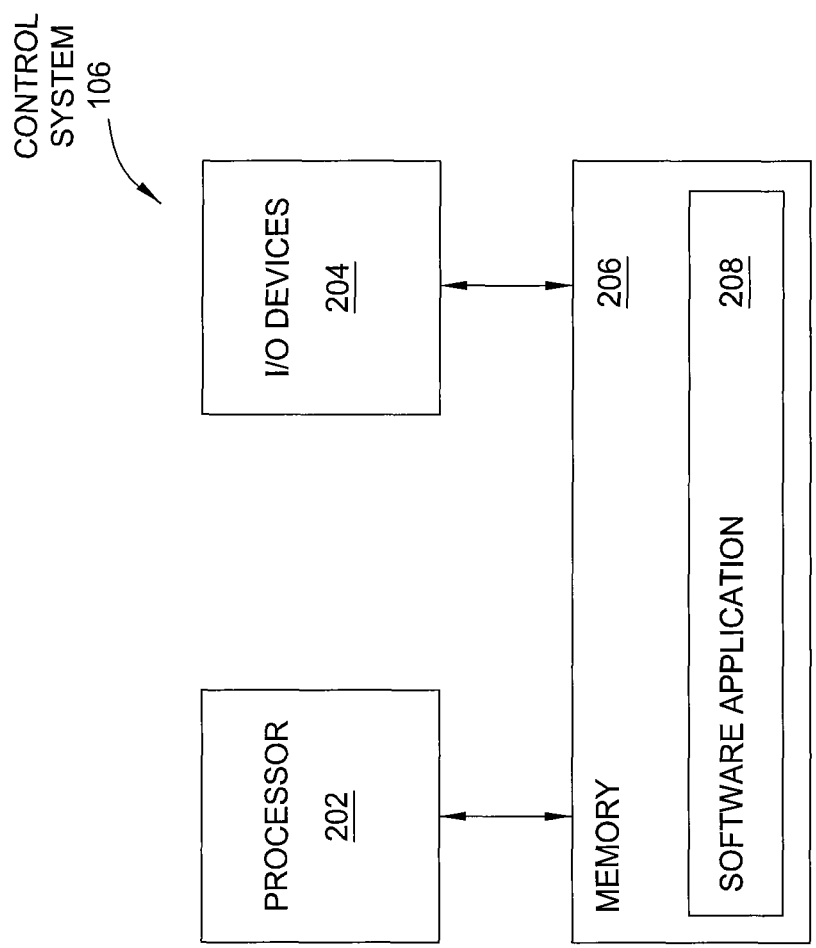
FIG. 2 illustrates a control system of FIG. 1 in greater detail.

FIG. 2 illustrates the control system 106 in greater detail. As shown, the control system 106 includes a processor 202, one or more input/output (I/O) devices 204, and memory 206. Memory 206 may be any technically feasible type of memory, including a random access memory (RAM) module, a read-only memory (ROM) module, a hard disk, or a flash disk, among others, and stores therein a software application 208 that contain instructions for controlling the operation of the optical components 104 during display and performing calibration operations. The processor 202 can be any technically feasible type of processor, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications, such as the software application 208. Alternatively, the processor 202 may be a dedicated hardware unit configured to perform specific tasks. In embodiments where the processor 202 is a dedicated hardware unit, the processor 202 (i) controls the operation of the optical components 104 and (ii) performs the calibration operations described above in conjunction with FIG. 1.

When controlling the operation of the optical components 104 during display, the processor 202 causes the optical components 104 to emit the laser beams 122 towards specific positions of the scan surface 116 at specific times in order to cause an image to appear on the image surface 114 of the display screen 102. When performing calibration operations, the processor 202 causes the optical components 104 to emit the laser beams 122 to the on-screen calibration area 118 and towards the off-screen calibration module 112. The processor 202 receives feedback signals from the detectors 108 and 110 and then accesses one or more calibration tables stored in memory 206. The calibration tables store timing data that specify the activation timings of laser sources that produce laser beams 122, and other data that are used to adjust the positions of various optical components. As shown, the processor 202 is coupled to the I/O devices 204 and to memory 206.

The I/O devices 204 include devices configured to receive input, such as a keyboard, a mouse, or a set of switches, among others. The I/O devices 204 also include devices configured to provide output, such as a speaker or a set of light-emitting diodes (LEDs), among others. The I/O devices 204 may additionally include devices configured to receive input and to provide output, such as a wireless network card, an Ethernet port, or a serial port, among others. The I/O devices 204 may receive data and then write the data to memory 206 or transmit the data to the processor 202. The I/O devices 204 may also read data from memory 206 and transmit the data to an external location.

In general, the control system 106 coordinates the operation of the laser-based display device 100, including the operation of the optical components 104 and performance of the calibration operations. As described in greater detail below in conjunction with FIG. 3, the control system 106 performs a first portion of the calibration operations using the on-screen calibration area 118 and the detector 108.

Figure 3:
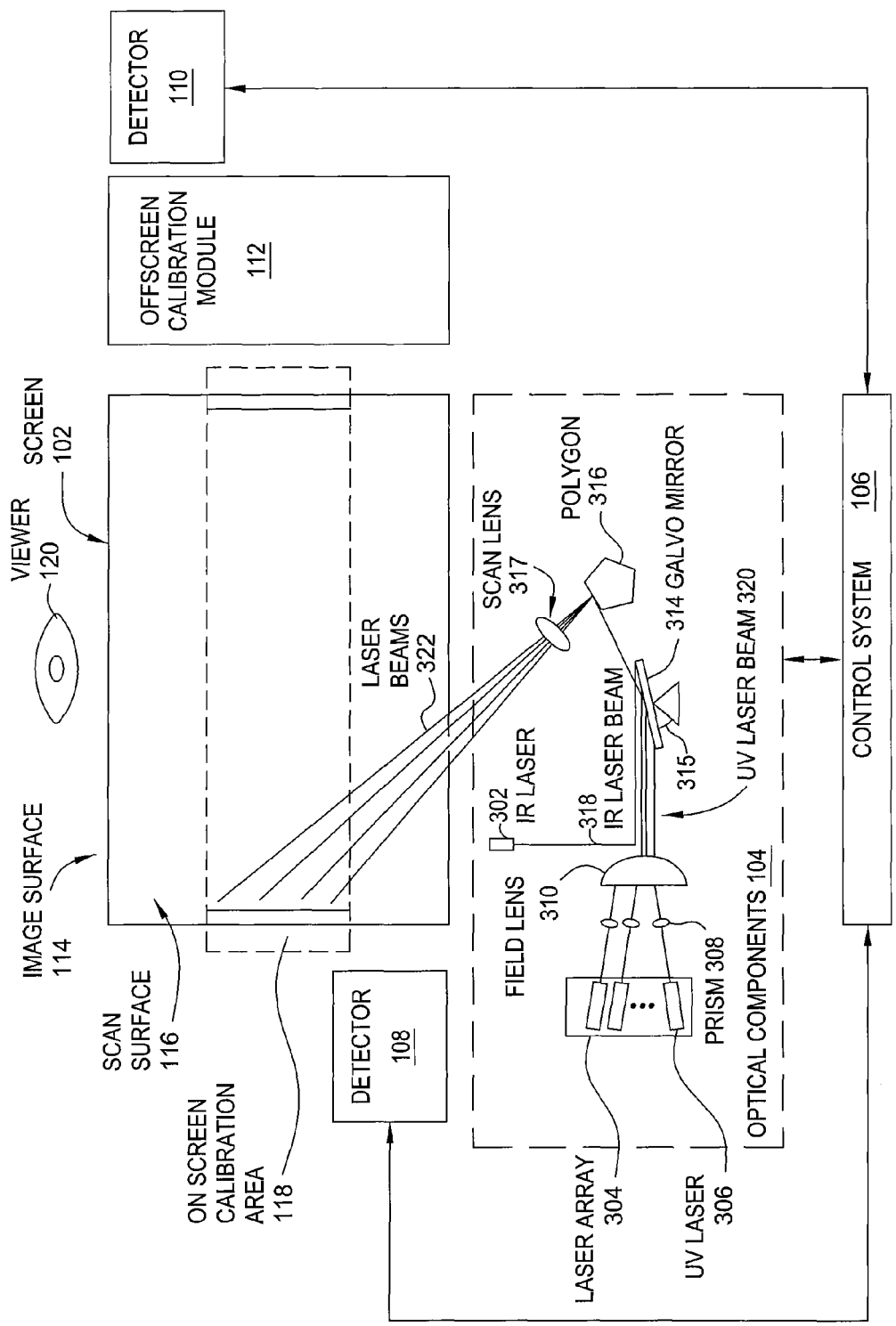
FIG. 3 illustrates the schematic of the laser-based display device of FIG. 1 in greater detail.

FIG. 3 illustrates the laser-based display device 100 of FIG. 1 in greater detail. As shown, the control system 106 within the laser-based display device 100 includes an infra-red (IR) laser 302, a laser array 304 that includes one or more ultraviolet (UV) lasers 306, prisms 308 each optically coupled to one of the UV lasers 306, a field lens 310 that includes a plurality of lens elements, a galvo mirror 314 disposed at an angle 315, and a polygon 316 configured to rotate at a pre-defined angular velocity. Each of the UV lasers 306 is configured to emit a UV laser beam 320, and the IR laser 302 is configured to emit an IR laser beam 318 to be in line with the UV laser beams 320. Those skilled in the art will understand that the IR laser beam 318 and the UV laser beams 320 (collectively, "laser beams 322") may each comprise a series of laser pulses. The IR laser 302 is used during calibration operations involving the optical components 104, as described in greater detail below. In the embodiments of the invention described herein, the IR laser 302 is used for non-imaging sensitive dynamic calibrations, and UV laser 306 are used for both imaging and for dynamic calibrations. In alternative embodiments, laser types other than IR and UV may be used for imaging and/or dynamic calibrations.

During normal operation of the laser-based display device 100, each of the UV lasers 306 emits a UV laser beam 320 through the prism 308 corresponding to that UV laser 306. As described in greater detail below, the vertical position of each prism 308 may be adjusted in order to modify the vertical offset of the UV laser beam 320 on the display screen 102. The prism 308 is controlled via a stepper motor (not shown) to shift the UV laser beam 320 and cause the UV laser beam 320 to be displaced on the display screen 102. Each of the prisms 308 is used to control the position of a corresponding UV laser beam 320. As described in greater detail below, the angle 315 of the galvo mirror 314 may be adjusted in order to adjust the positions of all of the UV laser beams 320 simultaneously.

The polygon 316 includes a plurality of mirrored facets. In one embodiment, the polygon 316 includes eight mirrored facets. However, those skilled in the art will understand that the polygon 316 may include any number of mirrored facets. As the polygon 316 rotates, different mirrored facets reflect the UV laser beams 320 toward the scan surface 116. A scan lens 317 can be used to project the UV laser beams 320 from the polygon 316 onto the display screen 102. When a given mirrored facet reflects the UV laser beams 320, the rotation of the polygon 316 causes the vertical angle with which that mirrored facet reflects the UV laser beams 320 to change. Consequently, the rotation of the polygon 316 for one facet causes the UV laser beams 320 to scan, or traverse, the scan surface 116 horizontally. In addition, each mirrored facet of the polygon 316 reflects the UV laser beams 320 towards a different horizontal band of the scan surface 116. Thus, each mirrored facet of the polygon 316 causes the UV laser beams 320 to traverse a different horizontal band of the scan surface 116. Further details of the polygon 316 are described in U.S. Patent Application Pub. No. 2010/0020377, which is incorporated by reference herein.

The UV laser beams 320 penetrate the scan surface 116 to a phosphor layer within the display screen 102. The phosphor layer of the display screen 102 includes a plurality of vertical stripes or regions of red, green, and blue (RGB) phosphors. Each stripe can be excited independently by the UV lasers 320 to produce red, green, and/or blue screen pixels of varying intensity. The light intensity of each screen pixel is a function of the intensity of the UV laser beam 320 used to excite the phosphor associated with that pixel. By causing the UV lasers 306 to emit UV laser beams 320 that excite specific pixels with specific color and intensity values, the control system 106 is capable of causing an image to appear on the image surface 114 of the display screen 102. In the embodiments of the invention described herein, UV laser beams 320 are imaging laser beams and are distinguished from the IR laser beam 318 which is a calibration laser beam. In alternate embodiments of the invention, any of the laser beams including UV laser beams 320 and the IR laser beam 318 can be a calibration laser beam.

Various factors influence the quality of the image created on the image surface 114, including (1) activation timings of the UV laser beams 320 as they scan across the scan surface, (2) the vertical scanning positions of the UV laser beams 320, (3) the vertical position of the image on the image surface 114, and (4) the resolution with which the image is created on the image surface 114. Each of these factors is described in greater detail below.

(1) In one embodiment, when the UV laser beams 320 traverse a given horizontal band of the scan surface 116, as previously described, each of the UV laser beams 320 impinges upon the scan surface 116 at specific locations along a horizontal scan line that depend on the activation and duration timing of the UV laser 306 associated with that UV laser beam 320. In other words, when a given UV laser 306 is activated at a specific time, the UV laser 306 emits a UV laser beam 320 that is reflected by the polygon 316 when the polygon 316 has a particular angular position. The reflected UV laser beam 320 then impinges upon the scan surface 116 at a horizontal position that is based on the angular position of the polygon 116 and the duration of the activation. When the activation timings of all of the UV lasers 306 are coordinated, all of the UV laser beams 320 scan across the horizontal band in a coordinated manner. Such coordinated traversal of the scan surface 116 is necessary in order to cause a coherent image to be created on the image surface 114. Due to system perturbations such as temperature or mechanical shifts, the activation timings of the UV lasers 306 may change relative to one another, or "drift" causing discoloration as the UV laser beams 320 will not be in synch with the RGB phosphor stripes on the display screen 102, thereby causing the UV laser beams 320 to impinge upon a wrong phosphor stripe. As such, the drift may cause the UV laser beams 320 to become uncoordinated.

(2) When traversing a given horizontal band of the scan surface 116, the UV laser beams 320 scan the display screen 102 at specific vertical positions relative to the other UV laser beams 320 at other horizontal bands. In one implementation, the UV laser beams 320 traverse one or more scan surface 116 in an arcing manner, and, thus, traverse a range of vertical positions during a single pass across the scan surface 116. To simplify the description, the UV laser beams 320 will be described as traversing just one vertical position in each pass across a given horizontal band of the scan surface 116. For a given pass, each UV laser beam 320 with a given beam shape excites phosphors that reside at different vertical positions within the phosphor stripes of the phosphor layer. The relative vertical positions of the UV laser beams 320, and, thus, the vertical spacing between the UV laser beams 320 is dependent on the adjusted positions of the prisms 308.

(3) The vertical positions of the UV laser beams 320 are also dependent on the angle 315 of the galvo mirror 314. In one implementation, since all of the UV laser beams 320 are reflected by the galvo mirror 314 collectively, the vertical positions with which all of the UV laser beams 320 traverse the scan surface 116 are all equally dependent on the angle 315 of the galvo mirror 316. Consequently, the vertical position of an image created on the image surface 114 is directly related to the angle 315.

(4) The angle 315 of the galvo mirror 314 may be incrementally changed for each complete or partial rotation of the polygon 316, thereby shifting the vertical positions with which the UV laser beams 320 traverse the scan surface 116 incrementally between or within rotations of the polygon 316. By shifting the angle 315 in this fashion, slightly different vertical positions of the phosphor stripes may be excited for each rotation of the polygon 316, thereby allowing the color and intensity of the pixels associated with those vertical positions to be set to precise values. In one implementation, the angle 315 is adjusted by about one line offset after a full revolution of the polygon 316 scanning a full surface, therefore creating interlaced or line-doubling per video frame. Consequently, an image may be created on the image surface 114 with a higher resolution.

As described above in (1)-(4), the quality of an image created on the image surface 114 is directly related to the activation timing of the UV lasers 306, the vertical positions of the prisms 308, and the angle 315 of the galvo mirror 314. Each of these characteristics can be adjusted independently in order to ensure the coherency and quality of the image using a different servo-mechanism. For example, the activation timing of the UV lasers 306 may be adjusted via a retiming servo-mechanism; the vertical position of each prism 308 may be adjusted via a stepper motor; and the angle 315 of the galvo mirror 314 may be adjusted via a galvanometer servo-mechanism. Those skilled in the art will recognize that the characteristics described above may also be adjusted using any other technically feasible electromechanical or electro-optical system under the control of the control system 106. In one embodiment, the adjustment of the activation timings of the UV lasers 306 is carried out before or after each scan across the scan surface 116, and the vertical position of each prism 308 is adjusted less frequently. The frequency in the adjustments of the vertical position of each prism 308 may, however, be increased by employing a stepper motor with faster response times.

The control system 106 performs a sequence of calibration operations to calibrate the laser-based display device 100 prior to use. These calibration operations are described in U.S. Patent Application Pub. No. 2010/0097678, the entire contents of which are incorporated by reference herein. After these calibration operations and during use of the display device, drift may occur and some of the calibration settings need to be adjusted to compensate for this drift.

Figure 4:
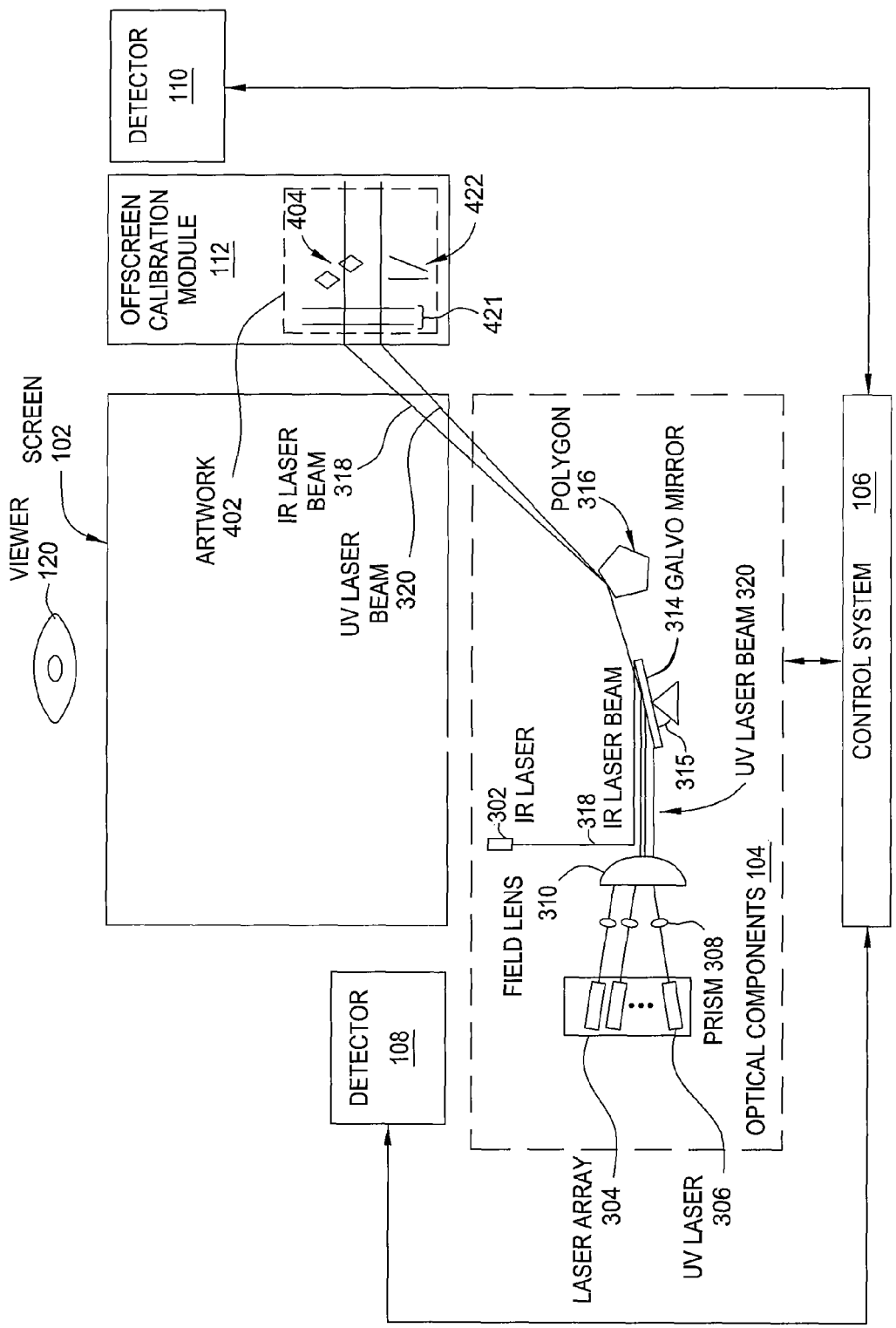
FIG. 4 illustrates the schematic of the laser-based display device of FIG. 1 in greater detail.

FIG. 4 illustrates the schematic of the laser-based display device of FIG. 1 in greater detail and shows the off-screen calibration module 112 that is used to adjust calibration settings to compensate for drift. These calibration settings include the activation timings of the UV lasers 306. The activation timings of the UV lasers 306 are defined in the calibration tables as an offset to the activation timing of the IR laser 302 or other reference beam. These offsets are adjusted in the manner described below to compensate for drift. The IR laser beam, referred to as the "invisible" servo beam in U.S. Patent Application Pub. No. 2010/00976782, is used on-screen or off-screen in various ways in the embodiments of the present invention, as further described below.

When performing calibration operations according to one or more embodiments of the invention to compensate for drift, the control system 106 controls the IR laser beam 318 to selectively activate when it reaches the off-screen calibration module 112. When the IR laser beam 318 activates upon reaching the off-screen calibration module 112, it traverses off-screen calibration features, in particular a pair of spaced vertical scribe lines 421 that are transmissive to both the IR laser beam 318 and the UV laser beams 320. The vertical scribe lines 421 are disposed on a surface of the artwork 402 that is absorptive to both the IR laser beam 318 and the UV laser beams 320. Alternatively, the surface of the artwork 402 may be reflective to both the IR laser beam 318 and the UV laser beams 320. The term "artwork" is used herein to describe a surface that has lines and marks drawn thereon to enable calibration. The control system 106 causes the IR laser beam 318 to traverse the pair of vertical scribe lines 421. The IR laser beam 318 is then transmitted through the vertical scribe lines 421 and optical elements (further described below) to a detector 110. The control system 106 then receives feedback data from the detector 110 indicating that the scribe lines 421 were traversed by the IR laser beam 318. Based on the feedback data, the control system 106 determines when the IR laser beam 318 traversed the pair of vertical scribe lines 421. In one embodiment, the vertical scribe lines 421 include a signature generating scribe region that extends vertically, i.e., in a direction transverse to the direction of scanning, and the signature generating scribe region includes a unique beam swath signature. Other off-screen calibration features disposed on a surface of the artwork 402 include scribes 404 and scribe marks 422, both of which are further described below.

The control system 106 also causes each of the UV laser beams 320 to traverse the pair of vertical scribe lines 421. In one embodiment, the control system 106 causes the UV laser beam 320 to traverse the vertical scribe lines 421 while the IR laser beam 318 traverses the vertical scribe lines 421. The control system 106 receives feedback data from the detector 110, and, based on the feedback data, the control system 106 determines when the UV laser beam 320 traversed the pair of vertical scribe lines 421. The control system 106 computes the difference in activation timing between the two lasers by comparing the time when the IR laser 302 traversed the pair of vertical scribe lines 421 to the time when the UV laser 306 traversed the pair of vertical scribe lines 421. For each UV laser 306, the control system 106 stores correction offsets into the calibration tables to reflect this difference in activation timing between the UV laser 306 and the IR laser 302. By doing so, the correction offsets will compensate for any drift in the activation timings of the UV lasers 306 with respect to a reference laser (i.e., IR laser 302) and thus with respect to each other as well. Consequently, when the activation timings of the UV laser beams 320 traversing the scan surface 116 is adjusted based on these correction offsets, an image with high color purity will result.

The control system 106 is further configured to calibrate the vertical positions with which each UV laser beam 320 traverses the scan surface 116 by adjusting the position of the prism 308 associated with each UV laser 306. To do this, the control system 106 causes the UV laser beams 320 to traverse scribes 404 on the artwork 402. Each of the scribes 404 defines a closed area on the artwork 402 that are transmissive to the UV laser beams 320 and is disposed on the artwork 402, the surface of which is otherwise absorptive to the UV laser beams 320. One pair of scribes 404 is provided on the surface of the artwork 402 for each of the UV laser beams 320. Only two are shown in FIG. 4 for simplicity. In one embodiment, the scribes 404 are diamond-shaped and the upper scribe 404A has the same geometry as the lower scribe 404B. They are slightly offset from each other in the scan direction.

Depending on the position of the UV laser beams 320 as they traverse a corresponding pair of scribes 404, a certain amount of light is transmitted through the upper scribe 404A and through the lower scribe 404B. For each UV laser beam 320, the ratio of the amount of light that is detected as having been transmitted through the upper scribe 404A to the amount of light that is detected as having been transmitted through the lower scribe 404B determines whether the vertical position of the UV laser beam will need to be adjusted. If the ratio differs from a default ratio that is determined from factory calibration, the position of the corresponding prism 308 is adjusted to correct for the difference. By repeating the process described above for each UV laser 306, the control system 106 adjusts the position of the prisms 308 such that the vertical positions of the UV laser beams 320 on the scan surface 116 are evenly spaced. Such even spacing allows an image with high color purity to be generated on the image surface 114.

Figure 5:
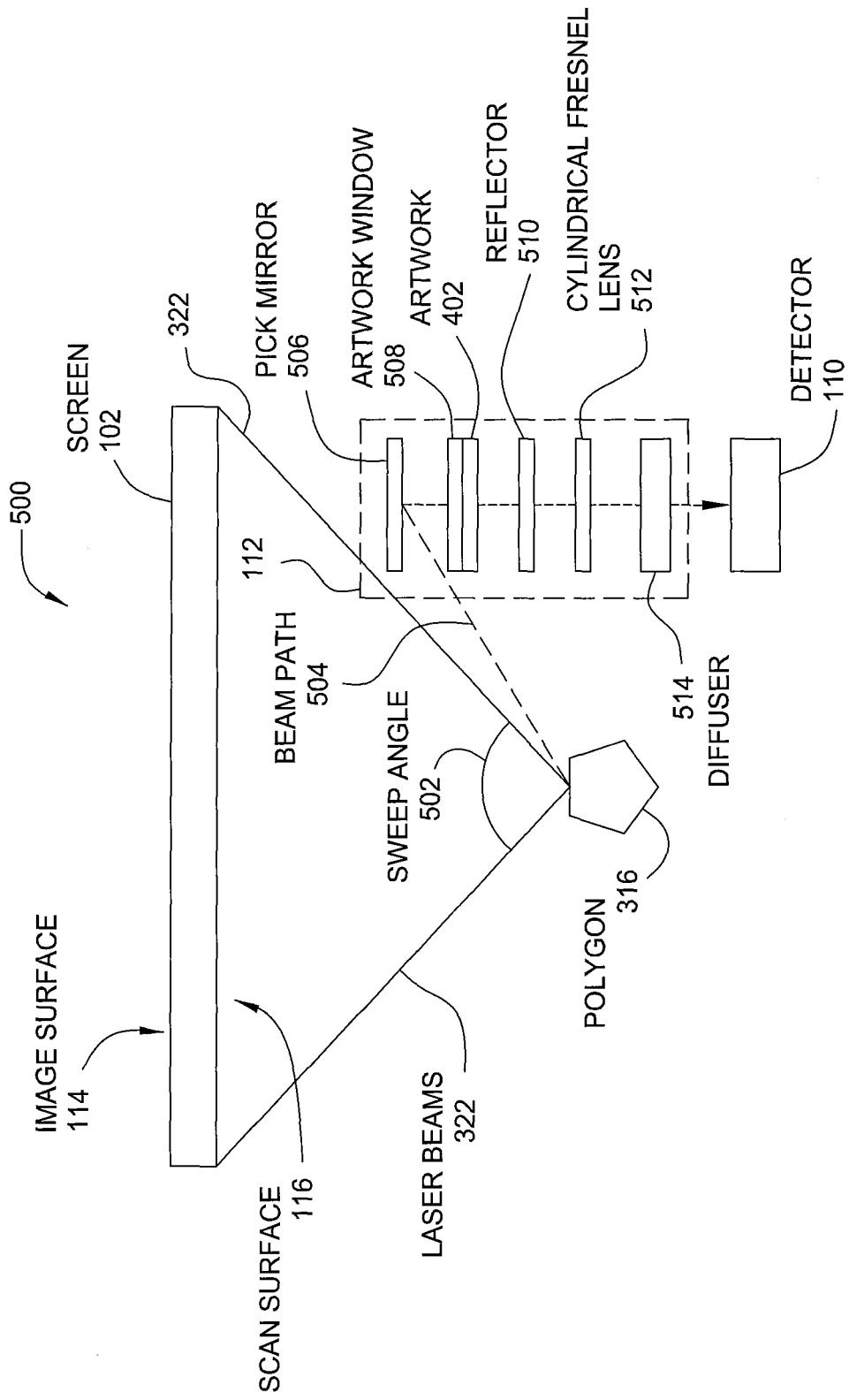
FIG. 5 illustrates a topological view of the laser-based display device of FIG. 1.

One advantage associated with the off-screen calibration module 112 is its position relative to the display screen 102 (i.e., it is physically separate from the display screen 102) that enables the calibration operation to be carried out while images are displayed without generating stray light that could interfere with the image being displayed. FIG. 5 is a topological view of the laser-based display device of FIG. 1, according to one embodiment of the invention. Some of the same components in FIGS. 3-4 and laser beams 322 traversing the scan surface 116 through a sweep angle 502 are illustrated in FIG. 5. As previously described, the laser beams 322 may be the IR laser beam 318 or the UV laser beams 320. As also described, the rotation of the polygon 316 causes the laser beams 322 to scan across the scan surface 116. When performing calibration operations using the off-screen calibration module 112, the control system 106 causes the laser beams 322 to traverse beyond the sweep angle 502 and to then travel along the beam path 504 towards the off-screen calibration module 112. As shown, the off-screen calibration module 112 includes a pick mirror 506, an artwork window 508 disposed on the artwork 402, a reflector 510, a cylindrical Fresnel lens 512, and a diffuser 514. The pick mirror 506 reflects the laser beams 322 beams through the artwork window 508 to the artwork 402. The artwork 402 includes a pair of scribe lines 421 and a set of scribes 404 that are transmissive to the IR laser beam 318 and to the UV laser beams 320. The reflector 510 reflects the transmitted portion of the laser beams to the cylindrical Fresnel lens 512. The cylindrical Fresnel lens 512 directs the reflected laser beams to the diffuser 514. The detector 110 then detects the diffuse laser beams. The configuration of the components of the off-screen calibration module 112 is discussed in greater detail below in conjunction with FIGS. 6A-6D.

As shown in FIG. 5, the off-screen calibration module 112 is positioned behind display screen 102 and within a box defined by the edges of the display screen 102. This configuration allows the image surface 114 to extend to the edges of the laser-based display device 100. The laser-based display device 100 having this configuration can be placed directly adjacent to another in order to form a tiled display system that does not include intervening gaps between image surfaces and provides a continuous image. By arranging multiple laser-based display devices in this fashion, a tiled wall display system may be constructed having an image surface that is uninterrupted by intervening gaps. In addition, the housing for the off-screen calibration module 112 is made of light-absorbing material so that laser beams directed to the off-screen calibration module 112 for calibration are completely contained within the off-screen calibration module 112.

In an alternative embodiment, the off-screen calibration module 112 is positioned on a side opposite to the one illustrated in FIG. 5, so that the rotation of the polygon 316 causes the laser beams 322 to first scan across the off-screen calibration module 112 before they scan across the scan surface 116. Other positions of the off-screen calibration module 112, e.g., closer to or further from the display screen 102, are within the scope of the present invention.

Figure 6B:
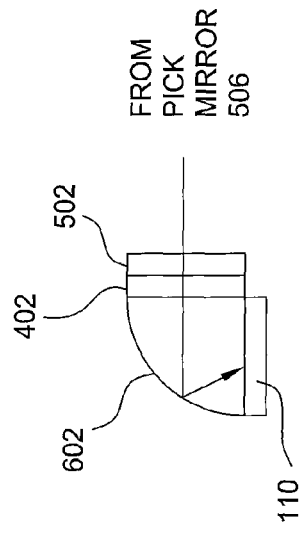
FIGS. 6A-6D illustrate an off-screen calibration module, according to various embodiments of the invention.
Figure 6D:
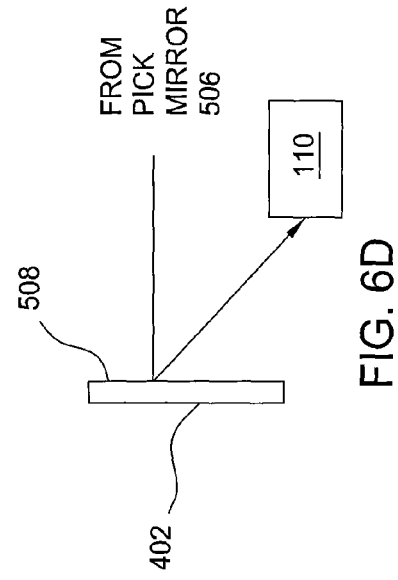
Figure 6A:
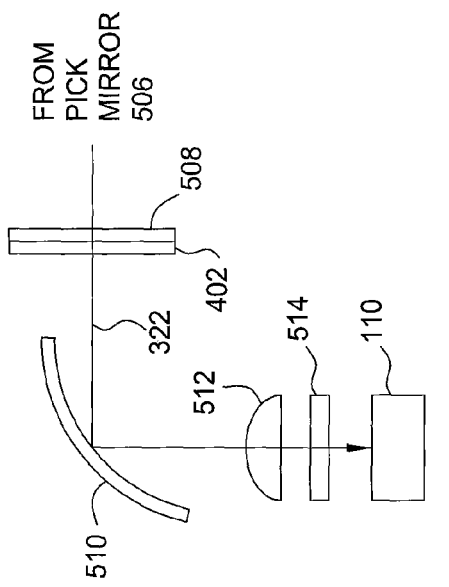
Figure 6C:
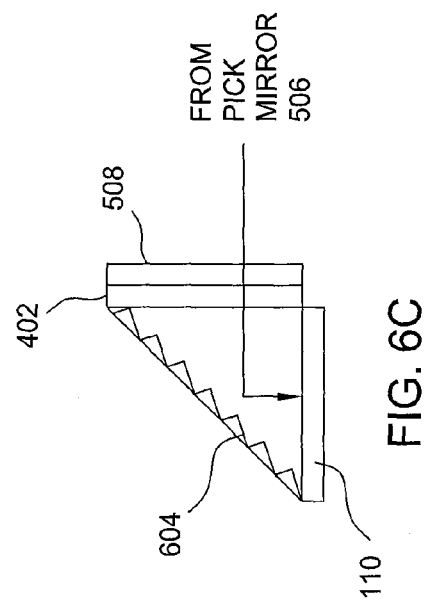

FIG. 6A illustrates the off-screen calibration module 112 in greater detail, according to one embodiment of the invention. As shown, the laser beam 322 travels from the pick mirror 506 through the artwork window 508 to the artwork 402. The artwork 402 allows a portion of the laser beams 322 to be transmitted to the reflector 510. The reflector 510 may be a convex mirror. The reflector 510 reflects the laser beams 322 to the cylindrical Fresnel lens 512, which, in turn, focuses the laser beams 322 towards to diffuser 514. The diffuser 514 conducts the diffuse laser beams 322 to the detector 110. The detector 110 then transmits feedback data to the control system 106. Those skilled in the art will recognize that the configuration of components shown in FIG. 6A represents just one possible embodiment of components within the off-screen calibration module 112. FIGS. 6B-6D illustrate several other embodiments.

FIG. 6B illustrates the off-screen calibration module 112 in greater detail, according to another embodiment of the invention. As shown, the laser beams 322 travel from the pick mirror 506 through the artwork window 508 to the artwork 402. The artwork 402 transmits a portion of the laser beams 322 through a light pipe 602. The light pipe 602, which has a reflective coating on its rear surface (i.e., surface opposite the one on which laser beams 322 impinge), conducts the portion of the laser beams 322 to the detector 110. The detector 110 detects the portion of the laser beams 322 and then transmits feedback data to the control system 106.

FIG. 6C illustrates the off-screen calibration module 112 in greater detail, according to another embodiment of the invention. As shown, the laser beams 322 travel from the pick mirror 506 through the artwork window 508 to the artwork 402. The artwork 402 transmits a portion of the laser beam 322 to a diffraction grating 604. The diffraction grating 604 diffracts the portion of the laser beams 322 towards the detector 110. The detector 110 detects the diffracted portion of the laser beams 322 and then transmits feedback data to the control system 106.

FIG. 6D illustrates the off-screen calibration module 112 in greater detail, according to another embodiment of the invention. As shown, the laser beams 322 travel from the pick mirror 506 through the artwork window 508 to the artwork 402. In the embodiment described herein, the scribes 404 on the artwork 402 are reflective to the laser beams 322, while the other portions of the artwork 402 are absorptive to the laser beams 322. The laser beams 322 traverse the artwork 402, which, in turn, reflects a portion of the laser beams 322 to the detector 110. The detector 110 detects the reflected portion of the laser beams 322 and then transmits feedback data to the control system 106.

Figure 7A:
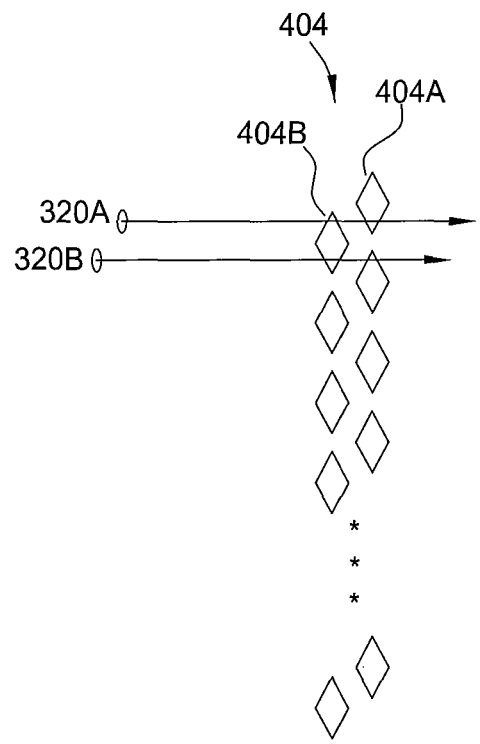
FIGS. 7A-7C illustrate calibration features disposed in an off-screen calibration module.
Figures 7B, 7C:
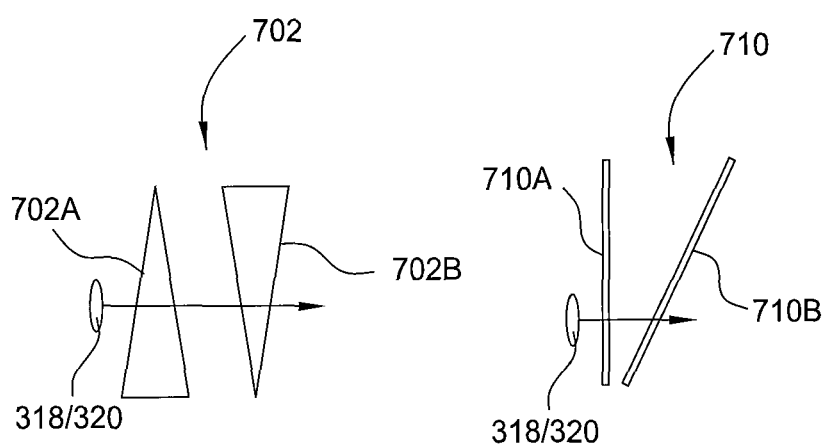

Each embodiment of the off-screen calibration module 112 includes the artwork 402 having scribe lines 421, scribes 404, and scribe marks 422. As described in greater detail below in conjunction with FIGS. 7A-7E, the geometry of the scribes 404 may vary in different embodiments of the invention. FIG. 7A illustrates scribes 404 according to the embodiment of the invention described in conjunction with FIG. 4. The scribes 404 are shaded to indicate that the entire closed area of each diamond-shaped scribe is transmissive to the laser beam that is scanned across it. The diamond-shaped scribe of this embodiment has the advantage in that the top and bottom of the same diamond (e.g., scribe 404B) can be used for two distinct laser beam tests (e.g., laser beams 320A and 320B). Shapes other than diamond may also be used. For example, parallelogram-shape scribes 704A and 704B shown in FIG. 7E may be used. FIG. 7B illustrates another embodiment of the scribes. Scribes 702A and 702B comprise triangles whose interiors are transmissive to the IR laser beam 318 and to the UV laser beam 320. As with the scribes 404A and 404B illustrated in FIG. 7A, the scribes 702A and 702B transmit different amounts of light of the IR laser beam 318 and/or the UV laser beam 320 depending on the vertical position with which those beams traverse the scribes 702A and 702B. Based on the ratio of how much light is transmitted through the scribes 702A and 702B and detected by the detector 110, the control system 106 adjusts the position of the prism 308 associated with the UV laser beam 320 accordingly.

The vertical positions of the UV laser beams 320 are also dependent on the angle 315 of the galvo mirror 314. Scribes marks 710 (shown as scribe marks 422 in FIG. 4) provided on the artwork 402, illustrated in FIG. 7C, are used to adjust the angle 315 of the galvo mirror 314 so that the UV laser beams 320 as a group produce an image that is centered on the display screen 102. In one embodiment, the IR laser beam 318 is scanned across scribe marks 710A and 710B. In alternative embodiments, any of the UV lasers beams 320 can be used. Test light which is scanning at a predetermined speed is transmitted through the scribe marks 710A and 710B and then detected by detector 110. The control system 106 calculates the time of traversal between the scribe marks 710A and 710B and compares it with a calibrated value. The time interval is based on the positioning of the test light across the scribe lines. Given that the scan is at a predetermined speed, if the calculated time of traversal is greater than the calibrated value, the distance between the scribe lines 710A and 710B are greater than if the calculated time of traversal is less than the calibrated value, which occurs when the distance between the scribe lines 710A and 710B are lesser. The angle of the galvo mirror 314 is rotated in a direction that adjusts the image on the display screen 102 to bring the test light's calculated time of traversal between the scribe lines 710A and 710B to the calibrated value.

In addition, the angle 315 of the galvo mirror 314 may be incrementally changed for each complete rotation of the polygon 316, thereby shifting the vertical positions with which the UV laser beams 320 traverse the scan surface 116 incrementally between rotations of the polygon 316. By shifting the angle 315 in this fashion, slightly different vertical positions of the phosphor stripes are excited in an interleaving manner with respect to the vertical positions excited prior to the shift for each rotation of the polygon 316. Consequently, an image may be created on the image surface 114 with a higher resolution and uniformity in the spatial arrangement of the pixels. In one embodiment, after this incremental change in the angle 315 of the galvo mirror 314, the IR laser beam 318 is scanned across scribe marks 710A and 710B. Light transmitted through the scribe marks 710A and 710B are then detected by detector 110. The control system 106 calculates the time of traversal between the scribe marks 710A and 710B and compares it with a predefined value. If the calculated time of traversal is greater than the predefined value, the angle of the galvo mirror 314 is rotated in a direction that lowers the image on the display screen 102. If the calculated time of traversal is less than the predefined value, the angle of the galvo mirror 314 is rotated in a direction that raises the image on the display screen 102.

In one embodiment, precision vertical placement of the beams is adjusted for all polygon facets in the manner described above. In an alternative embodiment, precision vertical placement of the beams is adjusted for each polygon facet.

Figure 7D:
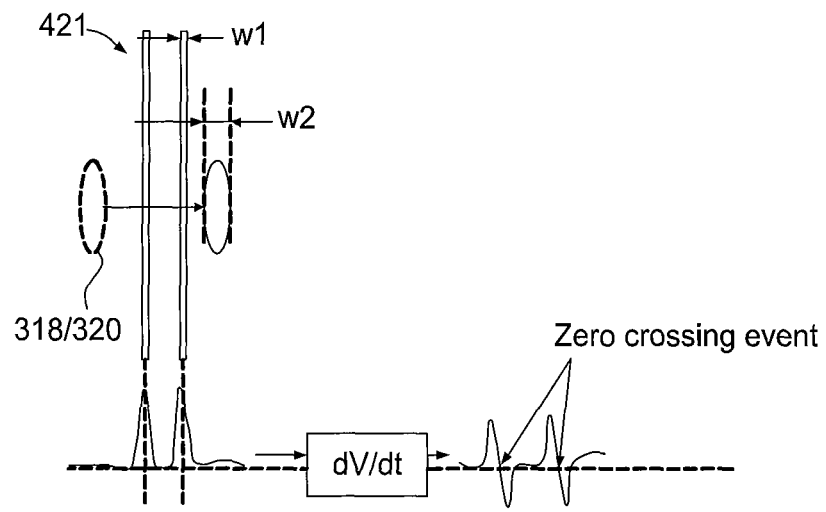
FIGS. 7D-7E illustrate the relationship between beam spot width and calibration feature size.
Figure 7E:
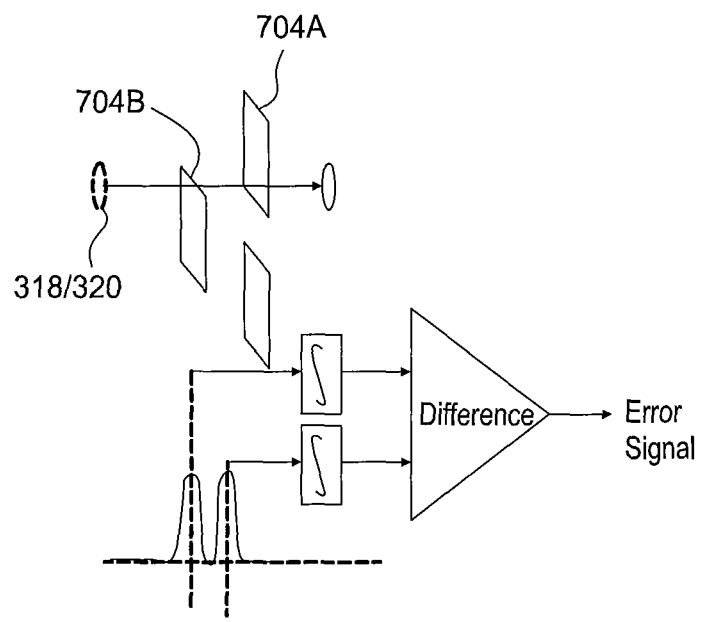

FIGS. 7D-7E illustrate the relationship between beam spot width and calibration feature size. As shown in FIG. 7D, as the laser beam 318/320 travels across the scribe line 421, a signal is produced that can be expressed as the scribe line 421 convolved with the laser beam waist. In order to minimize timing jitter, a differentiator circuit and a zero crossing detector are used to detect the timing of the laser beam's crossing of the scribe line 421. The laser beam waist size, w2, is configured to be larger than the scribe line width, w1, so that the signal produced has a well-defined singular peak. As illustrated, with appropriate values for w1 and w2, the singular peak, when differentiated, has a well-defined zero-crossing event.

As shown in FIG. 7E, as the laser beam 318/320 travels across the scribe 704B and then the scribe 704A, a signal is produced that can be expressed as each scribe convolved with the laser beam waist. The signal from each scribe is then integrated in time to produce a digital value equivalent to the integral of the scribe. The digital values associated with the two scribes are then compared to determine the vertical position of the laser beam 318/320. This is based on the predetermined correlation of time to spatial arrangement of the scribe lines.

Figure 8:
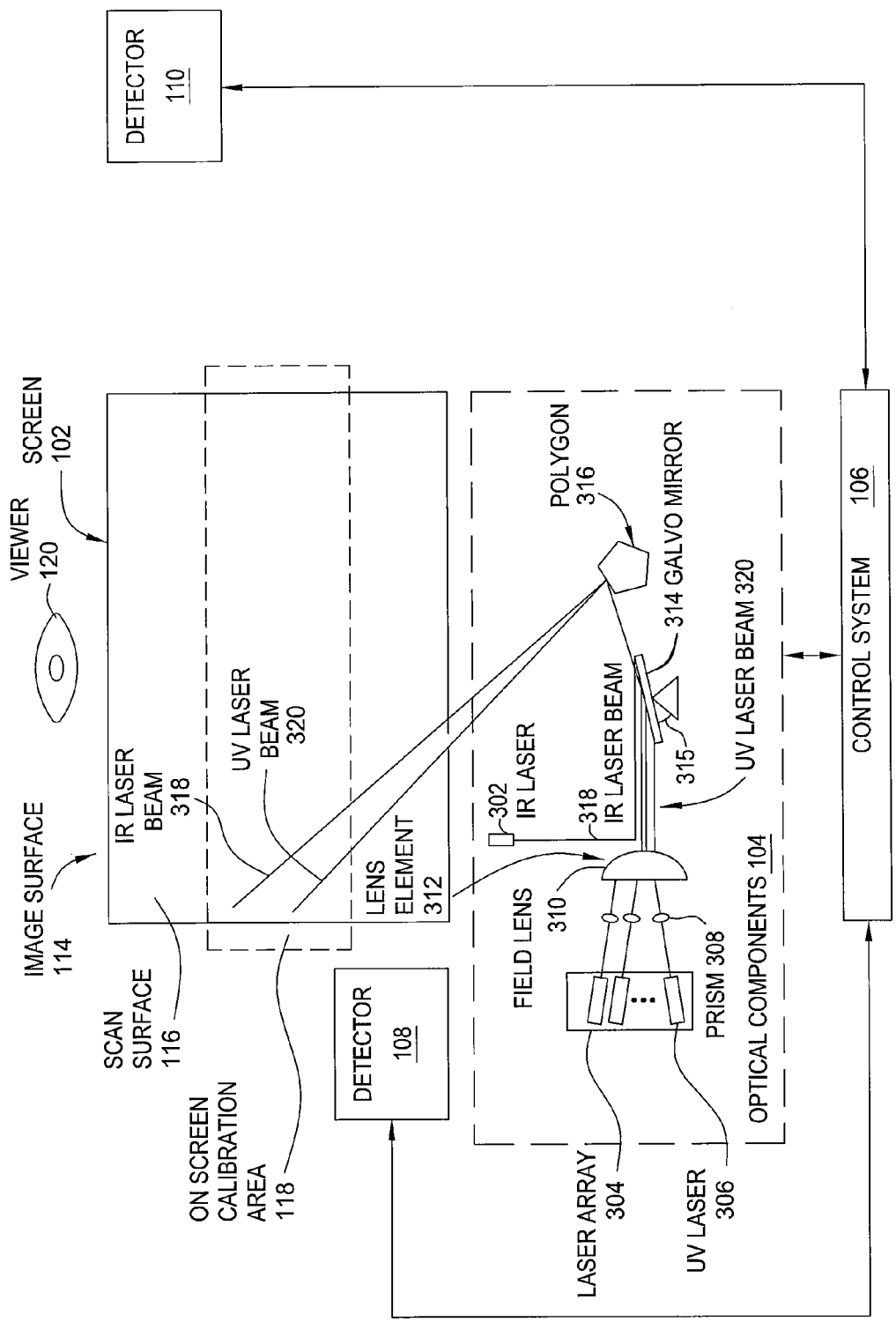
FIG. 8 illustrates a schematic of a laser-based display device according to another embodiment of the invention.

FIG. 8 illustrates a schematic of a laser-based display device according to another embodiment of the invention. In contrast to the embodiment of the invention described above, the off-screen calibration module 112 is not present in this embodiment. Instead, calibration features disposed in an on-screen calibration area 818 are used to generate optical feedback signals that are used in adjusting the optical components of the laser-based display device. These on-screen calibration features are arranged on the display screen 102 in the same manner as on-screen calibration features described in U.S. Patent Application Pub. No. 2010/00976782.

Figure 9A:
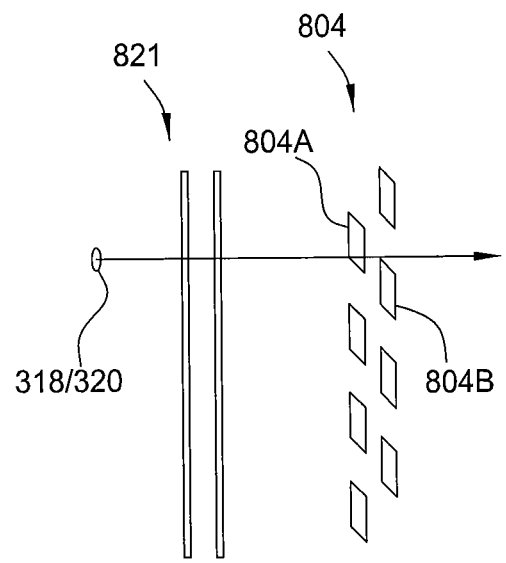
FIGS. 9A and 9B illustrate calibration features disposed on a display screen of the laser-based display device of FIG. 8.
Figure 9B:
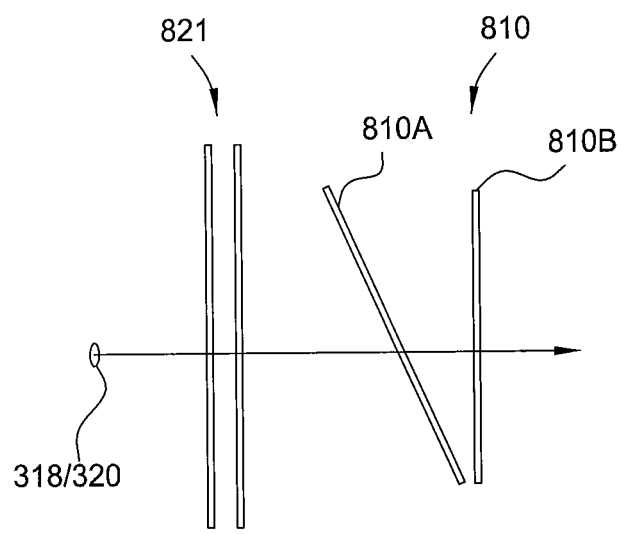

FIGS. 9A and 9B illustrate the calibration features disposed in the on-screen calibration area 818 of the laser-based display device. When performing calibration operations according to embodiments of the invention to compensate for drift, the control system 106 controls the IR laser beam 318 to traverse on-screen calibration features, in particular a pair of spaced vertical scribe lines 821 that are reflective to both the IR laser beam 318 and the UV laser beams 320. The IR laser beam 318 is then reflected and directed through a lens (not shown) onto the detector 108. The control system 106 then receives feedback data from the detector 108 indicating that the scribe lines 821 were traversed by the IR laser beam 318. Based on the feedback data, the control system 106 determines when the IR laser beam 318 traversed the pair of vertical scribe lines 821. In one embodiment, the vertical scribe lines 821 include a signature generating scribe region that extends vertically, i.e., in a direction transverse to the direction of scanning, and the signature generating scribe region includes a unique beam swath signature.

The control system 106 also causes each of the UV laser beams 320 to traverse the pair of vertical scribe lines 821. In one embodiment, the control system 106 causes the UV laser beam 320 to traverse the vertical scribe lines 821 while the IR laser beam 318 traverses the vertical scribe lines 821. The control system 106 receives feedback data from the detector 108, and, based on the feedback data, the control system 106 determines when the UV laser beam 320 traversed the pair of vertical scribe lines 821. The control system 106 computes the difference in activation timing between the two lasers by comparing the time when the IR laser 302 traversed the pair of vertical scribe lines 821 to the time when the UV laser 306 traversed the pair of vertical scribe lines 821. For each UV laser 306, the control system 106 stores correction offsets into the calibration tables to reflect this difference in activation timing between the UV laser 306 and the IR laser 302. By doing so, the correction offsets will compensate for any drift in the activation timings of the UV lasers 306 with respect to a reference laser (i.e., IR laser 302) and thus with respect to each other as well. Consequently, when the activation timings of the UV laser beams 320 traversing the scan surface 116 is adjusted based on these correction offsets, an image with high color purity will result.

The control system 106 is further configured to calibrate the vertical positions with which each UV laser beam 320 traverses the scan surface 116 by adjusting the position of the prism 308 associated with each UV laser 306. To do this, the control system 106 causes the UV laser beams 320 to traverse scribes 804. Each of the scribes 804 defines a closed area that is reflective to the UV laser beams 320. One pair of scribes 804 is provided on the on-screen calibration area 818 for each of the UV laser beams 320. In the illustrated embodiment, the scribes 804 have the shape of parallelograms, and the upper scribe 804A has the same geometry as the lower scribe 804B. They are slightly offset from each other in the scan direction. In another embodiment, the scribes 804 are diamond-shaped.

Depending on the position of the UV laser beams 320 as they traverse a corresponding pair of scribes 804, a certain amount of light is reflected from the upper scribe 804A and from the lower scribe 804B and collected at the detector 108. For each UV laser beam 320, the ratio of the amount of light that is detected as having been reflected from the upper scribe 804A to the amount of light that is detected as having been reflected from the lower scribe 804B determines whether the vertical position of the UV laser beam will need to be adjusted. If the ratio differs from a default ratio that is determined from factory calibration, the position of the corresponding prism 308 is adjusted to correct for difference. By repeating the process described above for each UV laser 306, the control system 106 adjusts the position of the prisms 308 such that the vertical positions of the UV laser beams 320 on the scan surface 116 are evenly spaced. Such even spacing allows an image with high color purity to be generated on the image surface 114.

The vertical positions of the UV laser beams 320 are also dependent on the angle 315 of the galvo mirror 314. Scribes marks 810 provided on the on-screen calibration area, illustrated in FIG. 9B, are used to adjust the angle 315 of the galvo mirror 314 so that the UV laser beams 320 as a group produce an image that is centered on the display screen 102. In one embodiment, the IR laser beam 318 is scanned across scribe marks 810A and 810B. In alternative embodiments, any of the UV lasers beams 320 can be used. Test light which is scanning at a predetermined speed is reflected from the scribe marks 810A and 810B and then detected by detector 108. The control system 106 calculates the time of traversal between the scribe marks 810A and 810B and compares it with a calibrated value. The time interval is based on the positioning of the test light across the scribe marks 810A and 810B. Given that the scan is at a predetermined speed, if the calculated time of traversal is greater than the calibrated value, the distance between the scribe marks 810A and 810B are greater than if the calculated time of traversal is less than the calibrated value, which occurs when the distance between the scribe marks 810A and 810B are lesser. The angle of the galvo mirror 314 is rotated in a direction that adjusts the image on the display screen 102 to bring the test light's calculated time of traversal between the scribe marks 810A and 810B to the calibrated value.

In addition, the angle 315 of the galvo mirror 314 may be incrementally changed for each complete rotation of the polygon 316, thereby shifting the vertical positions with which the UV laser beams 320 traverse the scan surface 116 incrementally between rotations of the polygon 316. By shifting the angle 315 in this fashion, slightly different vertical positions of the phosphor stripes are excited in an interleaving manner with respect to the vertical positions excited prior to the shift for each rotation of the polygon 316. Consequently, an image may be created on the image surface 114 with a higher resolution and uniformity in the spatial arrangement of the pixels. In one embodiment, after this incremental change in the angle 315 of the galvo mirror 314, the IR laser beam 318 is scanned across scribe marks 810A and 810B. Light reflected from the scribe marks 810A and 810B are then detected by detector 108. The control system 106 calculates the time of traversal between the scribe marks 810A and 810B and compares it with a predefined value. If the calculated time of traversal is greater than the predefined value, the angle of the galvo mirror 314 is rotated in a direction that lowers the image on the display screen 102. If the calculated time of traversal is less than the predefined value, the angle of the galvo mirror 314 is rotated in a direction that raises the image on the display screen 102.

In one embodiment, precision vertical placement of the beams is adjusted for all polygon facets in the manner described above. In an alternative embodiment, precision vertical placement of the beams is adjusted for each polygon facet.

By implementing the techniques described above, the control system 106 is capable of calibrating the activation timing of the UV lasers 320, the vertical position of each prism 308, and the angle 315 of the galvo mirror 316 to adjust the vertical and horizontal position of the image and the coherency of that image. The techniques described herein may be implemented during dedicated calibration operations, or, alternatively, during normal operation of the laser-based display device 100, i.e. when the laser-based display device 100 displays an image on the image surface 114.

Figure 10:
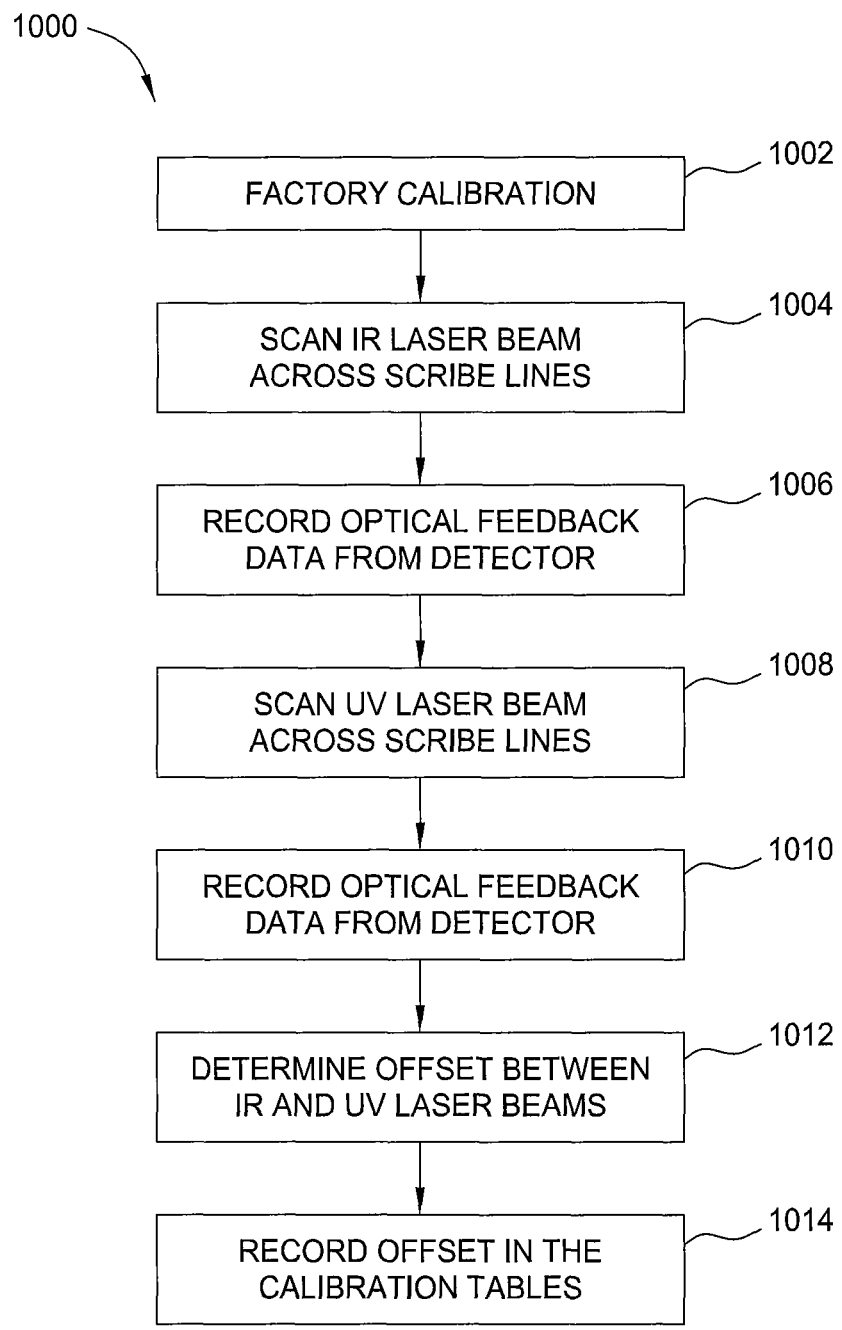
FIG. 10 is a flow diagram of a method for adjusting activation timings of lasers according to an embodiment of the invention.

FIG. 10 is a flow diagram of a method for adjusting activation timings of lasers according to an embodiment of the invention. Although the method steps are described in conjunction with the embodiments of the invention described herein, persons skilled in the art will recognize that any system configured to perform the method steps is within the scope of the invention.

As shown, the method 1000 begins at step 1002, where the control system 106 adjusts the position of the image on the image surface 114 through calibration as described in U.S. Patent Application Pub. No. 2010/0097678. In one embodiment, the remaining steps are carried out during use of a laser-based display device.

At step 1004, the control system 106 causes the IR laser beam 318 to traverse the scribe lines (e.g., scribe lines 421 or 821). At step 1006, the control system 106 records feedback data from a detector (e.g., detector 110 or 108). The feedback data indicates a time at which the IR laser beam 318 traversed the scribe lines.

At step 1008, the control system 106 causes one of the UV laser beam 320 to traverse the scribe lines. At step 1010, the control system 106 records feedback data from the detector. The feedback data indicates a time at which the UV laser beam 320 traversed the scribe lines.

At step 1012, the control system 106 determines an offset between the IR laser beam 318 and the UV laser beam 320 based on the feedback data received from the detector. At step 1014, the control system 106 records this offset in the calibration tables for use by the control system 106 in controlling the activation timing of the UV laser 306. Steps 1008, 1010, 1012 and 1014 are carried out for each of the UV laser beams 320.

Figure 11:
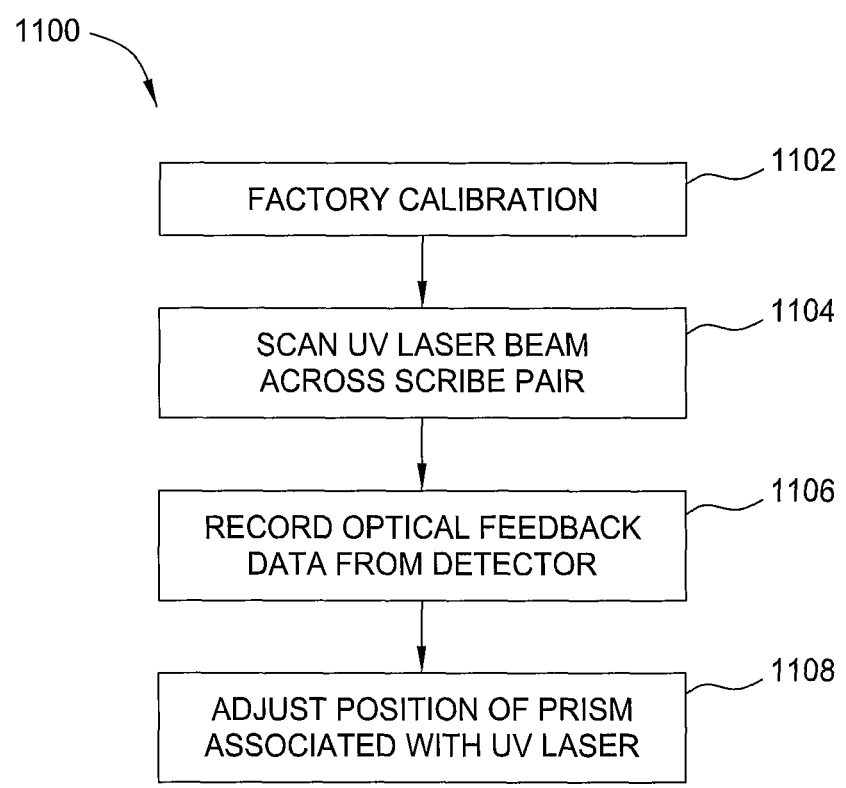
FIG. 11 is a flow diagram of a method for adjusting vertical scan positions of lasers according to an embodiment of the invention.

FIG. 11 is a flow diagram of a method for adjusting vertical scan position of lasers according to an embodiment of the invention. Although the method steps are described in conjunction with the embodiments of the invention described herein, persons skilled in the art will recognize that any system configured to perform the method steps is within the scope of the invention.

As shown, the method 1100 begins at step 1102, where the control system 106 adjusts the position of the image on the image surface 114 through calibration as described in U.S. Patent Application Pub. No. 2010/0097678. In one embodiment, the remaining steps are carried out during use of a laser-based display device.

At step 1104, the control system 106 causes the UV laser beam 320 to traverse a scribe pair (e.g., scribes 404 or 804). At step 1106, the control system 106 records feedback data from a detector (e.g., detector 110 or 108). The feedback data indicates relative amounts of light transmitted through or reflected from the scribe pair. At step 1108, the control system 106 adjusts the position of prism 308 associated with the UV laser beam 320 so that the ratio of the amounts of light transmitted through or reflected from the scribe pair are equal to a predefined calibration value. Steps 1104, 1106, and 1108 are carried out for each of the UV laser beams 320.

Figure 12:
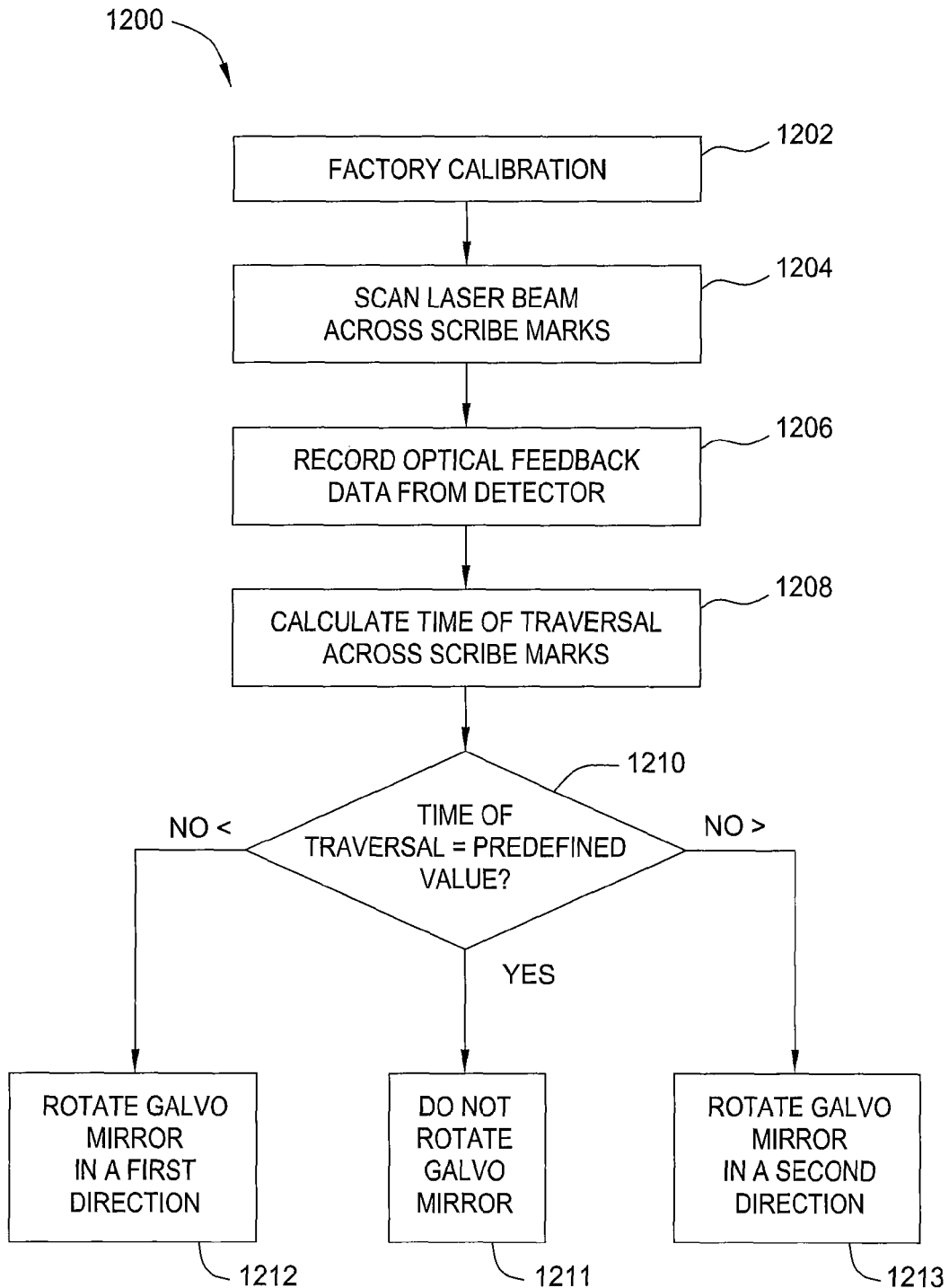
FIG. 12 is a flow diagram of a method for adjusting vertical scan positions of a group of lasers according to an embodiment of the invention.

FIG. 12 is a flow diagram of a method for adjusting vertical scan positions of a group of lasers according to an embodiment of the invention. Although the method steps are described in conjunction with the embodiments of the invention described herein, persons skilled in the art will recognize that any system configured to perform the method steps is within the scope of the invention.

As shown, the method 1200 begins at step 1202, where the control system 106 adjusts the position of the image on the image surface 114 through calibration as described in U.S. Patent Application Pub. No. 2010/0097678. In one embodiment, the remaining steps are carried out during use of a laser-based display device.

At step 1204, the control system 106 causes the IR laser beam 318 or one of the UV laser beams 320 to traverse scribe marks (e.g., scribe marks 710 or 810). At step 1206, the control system 106 records feedback data from a detector (e.g., detector 110 or 108). The feedback data indicates a time interval when the IR laser beam 318 or the UV laser beam traversed the scribe marks. At step 1208, the control system 106 calculates this time interval based on the feedback data and, at step 1210, compares it with a predefined value. If the calculated time of traversal is equal to the predefined value, the angle of the galvo mirror 314 is not rotated (step 1211). If the calculated time of traversal is greater than the predefined value, the angle of the galvo mirror 314 is rotated in a first direction that lowers the image on the display screen 102 (step 1212). If the calculated time of traversal is less than the predefined value, the angle of the galvo mirror 314 is rotated in a second direction, opposite the first direction, that raises the image on the display screen 102 (step 1213).

While the foregoing is directed to embodiments of the present invention, other and further embodiments of the invention may be devised without departing from the basic scope thereof, and the scope thereof is determined by the claims that follow.

We claim:

1. A laser-based display device, comprising:
a display screen; and
a component housing including therein:
laser beam sources for producing laser beams including at least one calibration laser beam;
a rotating polygon having a plurality of mirrored facets, each mirrored facet causing the laser beams to be scanned across the display screen; and
an off-screen calibration module that is physically separate from the display screen, having passive calibration features that are positioned in optical paths of the laser beams reflected by the mirrored facets, wherein the passive calibration features are transmissive and the off-screen calibration module includes an elliptical reflector that receives light transmitted through the passive calibration features and directs the transmitted light to a single detector.

2. The device of claim 1, wherein the off-screen calibration module further includes a directing lens between the elliptical reflector and the single detector.

3. The device of claim 2, wherein the directing lens is a Fresnel lens.

4. The device of claim 3, wherein the off-screen calibration module further includes a diffuser between the Fresnel lens and the single detector.

5. The device of claim 2, wherein the directing lens is a cylindrical lens.

6. The device of claim 2, wherein the off-screen calibration module further includes a diffuser disposed between the directing lens and the detector, the diffuser adapted to diffuse the light transmitted between the directing lens and the detector.

7. A laser-based display device, comprising:
a display screen; and
a component housing including therein:
laser beam sources for producing laser beams including at least one calibration laser beam;
a rotating polygon having a plurality of mirrored facets, each mirrored facet causing the laser beams to be scanned across the display screen through a sweep angle; and
an off-screen calibration module that is physically separate from the display screen, having passive calibration features that are positioned in an optical path of the at least one calibration laser beam reflected by at least one mirrored facet of the plurality of mirrored facets, wherein the optical path of the at least one calibration laser beam reflected by the at least one mirrored facet traverses beyond the sweep angle to the off-screen calibration module, and wherein the off-screen calibration module includes a reflector that receives light from the at least one calibration laser beam transmitted through the passive calibration features and directs the transmitted light to a single detector.

8. The device of claim 7, wherein the reflector is cylindrical.

9. The device of claim 8, wherein the off-screen calibration module further includes a directing lens between the reflector and the single detector.

10. The device of claim 9, wherein the directing lens is a cylindrical lens.

11. The device of claim 9, wherein the directing lens is a Fresnel lens.

12. The device of claim 9, wherein the off-screen calibration module further includes a diffuser disposed between the directing lens and the detector, the diffuser adapted to diffuse the light transmitted between the directing lens and the detector.

13. The device of claim 8, wherein the passive calibration features are transmissive.

14. The device of claim 8, wherein the passive calibration features are reflective.

15. The device of claim 7, wherein the passive calibration features are reflective and the reflector is elliptical.

16. The device of claim 7, wherein the scanned laser beams form an image on the display screen, the image extending to the edges of the display screen.

17. The device of claim 7, wherein the off-screen calibration module is positioned behind the display screen.

18. A laser-based display device, comprising:
   a display screen; and
   a component housing including therein:
      laser beam sources for producing laser beams including at least one calibration laser beam;
      a rotating polygon having a plurality of mirrored facets, each mirrored facet causing the laser beams to be scanned across the display screen through a sweep angle; and
      an off-screen calibration module that is physically separate from the display screen, having passive calibration features that are positioned in an optical path of the at least one calibration laser beam reflected by at least one mirrored facet of the plurality of mirrored facets, wherein the optical path of the at least one calibration laser beam reflected by the at least one mirrored facet traverses beyond the sweep angle, and wherein the off-screen calibration module includes a lens adapted to direct light from the at least one calibration laser beam transmitted through the passive calibration features to a single detector.

19. The device of claim 18, wherein the lens is a cylindrical lens.

20. The device of claim 18, wherein the lens is a Fresnel lens.

21. The device of claim 18, wherein the passive calibration features are transmissive.

22. The device of claim 18, wherein the passive calibration features are reflective.

23. The device of claim 18, wherein the off-screen calibration module further includes a reflector that receives light transmitted through the passive calibration features and directs the transmitted light to the lens.

24. The device of claim 23, wherein the reflector is cylindrical.

25. The device of claim 23, wherein the reflector is elliptical.

26. The device of claim 18, wherein the off-screen calibration module further includes a diffuser disposed between the lens and the detector, the diffuser adapted to diffuse the light transmitted between the lens and the detector.

27. The device of claim 18, wherein the scanned laser beams form an image on the display screen, the image extending to the edges of the display screen.

28. The device of claim 18, wherein the off-screen calibration module is positioned behind the display screen.

* * * * *